(12) United States Patent
Tsur et al.

(10) Patent No.: US 11,131,793 B2
(45) Date of Patent: Sep. 28, 2021

(54) METHOD AND APPARATUS THAT ENHANCE THE VIEWING EXPERIENCE OF DIGITAL DISPLAYS

(71) Applicant: PhoneOptika Ltd., Sde Warburg (IL)

(72) Inventors: Shraga Tsur, Tel Aviv (IL); Arie Heiman, Sde Warburg (IL)

(73) Assignee: PHONEOPTIKA LTD, Sde Warburg (IL)

( * ) Notice: Subject to any disclaimer, the term of this patent is extended or adjusted under 35 U.S.C. 154(b) by 402 days.

(21) Appl. No.: 15/964,068

(22) Filed: Apr. 27, 2018

(65) Prior Publication Data

US 2018/0348813 A1  Dec. 6, 2018

Related U.S. Application Data

(60) Provisional application No. 62/492,208, filed on Apr. 30, 2017.

(51) Int. Cl.
| | |
|---|---|
| *G02B 3/00* | (2006.01) |
| *G02B 5/20* | (2006.01) |
| *G02B 27/30* | (2006.01) |
| *G02B 27/09* | (2006.01) |
| *G02B 27/46* | (2006.01) |

(52) U.S. Cl.
CPC .......... *G02B 5/201* (2013.01); *G02B 3/0006* (2013.01); *G02B 3/0062* (2013.01); *G02B 27/0955* (2013.01); *G02B 27/30* (2013.01); *G02B 27/46* (2013.01); *G09G 2300/0439* (2013.01)

(58) Field of Classification Search
None
See application file for complete search history.

(56) References Cited

U.S. PATENT DOCUMENTS

| | | | | |
|---|---|---|---|---|
| 5,187,599 | A * | 2/1993 | Nakanishi | G02F 1/133526 349/95 |
| 5,504,597 | A * | 4/1996 | Sprague | G02B 3/0056 349/112 |
| 9,519,206 | B1 * | 12/2016 | Norton | G03B 21/602 |
| 10,768,472 | B2 * | 9/2020 | Gu | G02F 1/133526 |
| 2006/0139758 | A1 * | 6/2006 | Segawa | B29D 11/00365 359/619 |
| 2006/0238545 | A1 * | 10/2006 | Bakin | G02B 30/27 345/613 |
| 2006/0268404 | A1 * | 11/2006 | Hyobu | G03B 21/10 359/456 |
| 2008/0144174 | A1 * | 6/2008 | Lucente | H04N 13/307 359/463 |

(Continued)

*Primary Examiner* — Derek S. Chapel
(74) *Attorney, Agent, or Firm* — Reches Patent

(57) ABSTRACT

A method and an apparatus for enhancing display visibility of a multiple pixel display. The apparatus may include: (i) an array of spatial filters that may be construed and arranged to block side ambient radiation. Each spatial filter has a minimal thickness of microscopic scale; (ii) transparent elements that may be positioned between the spatial filters of the array; (iii) a first array of microlenses that may be arranged and construed to focus the radiation generated by the display to provide focused radiation that propagates through the transparent elements without impinging on the array of spatial filters; and (iv) a second array of microlenses that may be arranged and construed to re-collimate the focused radiation to provide an output radiation.

10 Claims, 11 Drawing Sheets

(56) References Cited

U.S. PATENT DOCUMENTS

| | | | |
|---|---|---|---|
| 2009/0073329 A1* | 3/2009 | Hsu | H04N 9/3152 |
| | | | 349/8 |
| 2012/0170072 A1* | 7/2012 | Miyazaki | H04N 1/02805 |
| | | | 358/1.13 |
| 2018/0335615 A1* | 11/2018 | Tsur | G02B 21/025 |
| 2019/0041555 A1* | 2/2019 | Tsur | G02B 5/0294 |
| 2020/0363564 A1* | 11/2020 | Tsur | G02B 3/0062 |

* cited by examiner

Prior art

METHOD AND APPARATUS THAT ENHANCE THE VIEWING EXPERIENCE OF DIGITAL DISPLAYS

CROSS REFERENCE

This application claims the priority of U.S. provisional patent 62/492,208 filing date Apr. 30, 2017.

BACKGROUND

Today digital displays are very popular. They are used in mobile phones, smart phones, wearable devices, tablets, computers, TV, cars, digital camera, etc. However, in some cases the user encounters challenges that reduce significantly his viewing experience.

SUMMARY

There may be provided an apparatus and method for increasing display visibility.

There may be provided an apparatus for enhancing display visibility of a display that may include multiple display pixels, the apparatus may include an array of spatial filters that may be construed and arranged to block side ambient radiation; wherein each spatial filter has a minimal thickness of microscopic scale; transparent elements that may be positioned between the spatial filters of the array; a first array of microlenses that may be arranged and construed to focus the radiation generated by the display to provide focused radiation that propagates through the transparent elements without impinging on the array of spatial filters; and a second array of microlenses that may be arranged and construed to re-collimate the focused radiation to provide an output radiation.

The apparatus may be configured to convert the radiation generated by the display to the output radiation without introducing distortions and loss of resolution that may be sensed by a human eye.

The second array of microlenses may be configured to disperse reflected ambient radiation that impinges on the second array of microlenses.

The apparatus may include a base layer that may be arranged and construed to reduce refraction index mismatches between the apparatus and a glass layer, wherein the glass layer may be attached to the display or belongs to the display.

The second array of microlenses may include negative microlenses; and wherein the first array of microlenses may include positive microlenses.

The apparatus may include an anti-reflective coating layer.

Each display pixel may be associated with a single microlenses of the first array of microlenses, with a single microlenses of the second array of microlenses, with a single transparent element, and with a single spatial filter.

A focal point of a microlenses of the first array of microlenses overlaps a focal point of a corresponding microlenses of the second array of microlenses.

Two or more spatial filters may have a uniform thickness.

Two or more spatial filters may have a non-uniform thickness.

The first array of microlenses may be positioned between an interior end of the array of spatial filters and an exterior end of the array of spatial filters.

The first array of microlenses may be positioned below the array of spatial filters.

The second array of microlenses may be positioned above an interior end of the array of the spatial filters.

The apparatus the microlenses of the first array of microlenses and the microlenses of the second array of microlenses may be positioned at opposite sides of an interior plane located at the interior end of the array of the spatial filters.

The array of the spatial filters defines an array of apertures that may be positioned at the interior plane.

Focal points of microlenses of the first array of microlenses may be positioned at the interior plane.

Focal points of microlenses of the second array of microlenses may be positioned at the interior plane.

There may be provided for utilizing any of the apparatuses illustrated in the specification.

There may be provided a method for enhancing display visibility of a display that may include multiple display pixels, the method may include blocking, by an array of spatial filters, side ambient radiation; wherein each spatial filter has a minimal thickness of microscopic scale; focusing, by a first array of microlenses, the radiation generated by the display to provide focused radiation that propagates through transparent elements that may be spaced between the spatial filters of the array, without impinging on the array of spatial filters; and re-collimating, by a second array of microlenses, the focused radiation.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
FIG. 1 illustrates prior art displays.
Figure 1:

There are provided a method and an apparatus that improves significantly the user experience in the following cases:

a. When a digital display is used outdoors on a sunny day, it is almost impossible to see what is displayed on the screen, this is due to the glare of the sun and the ambient light that significantly lower the contrast of the display below usability. We call it blindness of the display. As an example, in FIG. 1 we depict two typical displays of a mobile phone in outdoor (left side of FIG. 1) on a sunny day and in indoor (right side of FIG. 1) scenarios respectively. This phenomenon occurs especially in mobile devices where the ambient light conditions change significantly while their display brightness is limited, such as mobile phones, tablets, wearable device displays in cars, navigation displays, Digital camera display, etc., that are used in indoor and outdoor scenarios, day and night.

b. In order to reduce the blindness effect of the display, some people block the sun with their hand in order to improve the visibility of the display but with little success. Popular Anti-Glare, matte finish screen protectors, scatter the ambient light but with little success and at the cost of reducing the resolution of the displayed image.

There may be provided a method and an apparatus that reduce the blindness effect of the display. The method can be embedded as an additional thin layer of the display or can be used as an add-on transparent thin film that covers the display.

Figure 2:
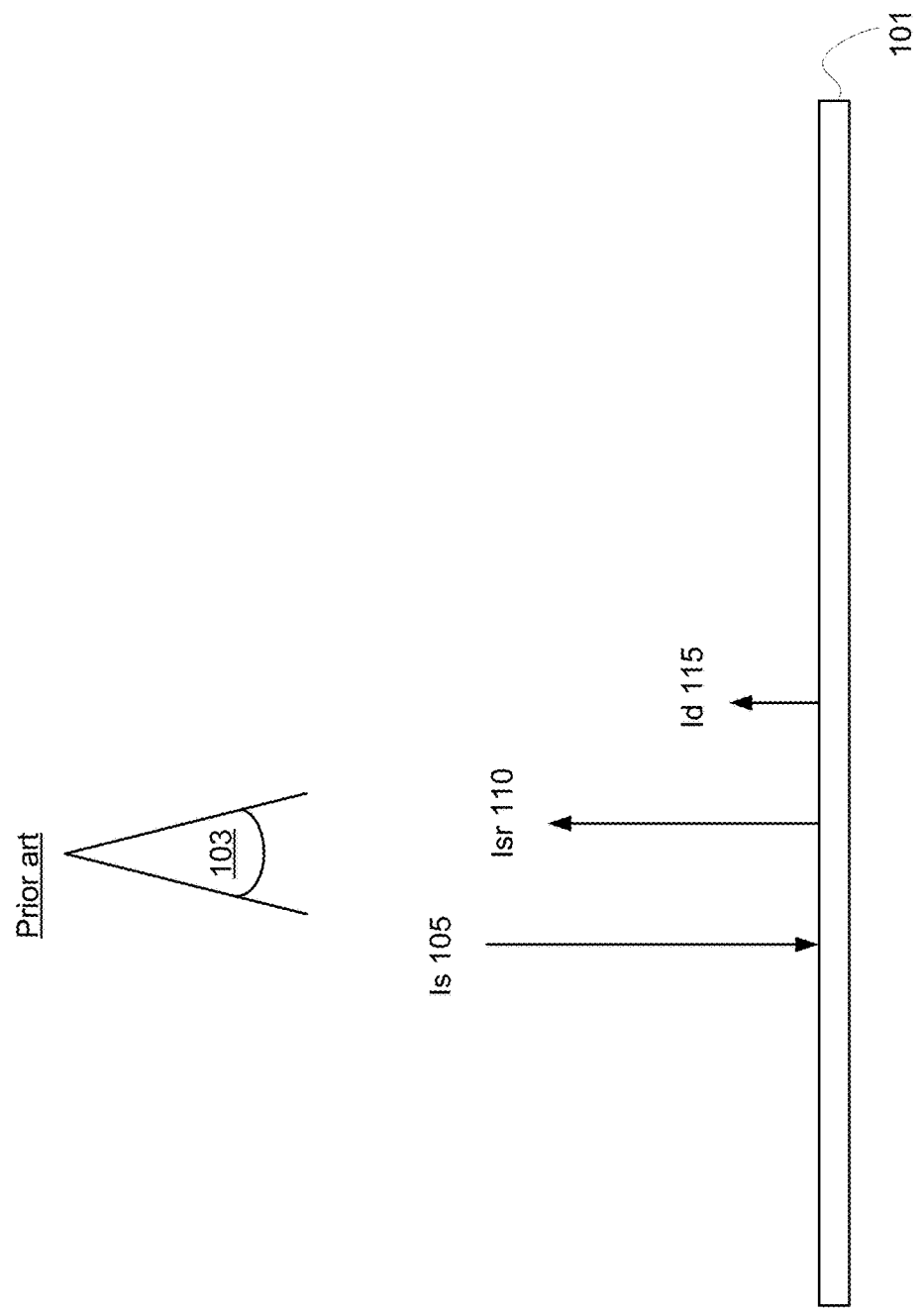
FIG. 2 illustrates relationships between different light rays.

The intensity of the ambient light in indoor is around 1,000 lux and the reflection coefficient of the cover glass of the display is about 4% and the displayed image is clear and visible. However, the intensity of the ambient light in outdoor, in a sunny day, is around 100,000 lux and the reflection coefficient of the cover glass of the display is about 4%, while the typical display brightness is in the range of 300-1000 cd/m^2 hence, in order be able to see the display clearly, it is necessary to reduce the intensity of the reflected ambient light by a factor of 1-2 orders of magnitude. FIG. 2 illustrates the impact of the ambient light 105 with intensity Is on the display panel 101.

Let us denote Isr as the intensity of the reflected ambient light 110 from the display panel. Isr=Is*rd where rd is the reflection coefficient of the display that accumulates the reflection from all its optical interfaces. Id is the intensity of the image 115 that is presented on the display 101. On a sunny day Isr>>Id, hence the contrast Id/Isr is too low hence, Id the signal of the display is almost unnoticeable by the user eye 103, which effectively blocks the user eye from seeing the displayed image.

The apparatus may include a combination of different optical layers that can be embedded as a special thin film on the top of the cover glass of the display as an add-on or embedded as a special layer in the display.

Figure 3:
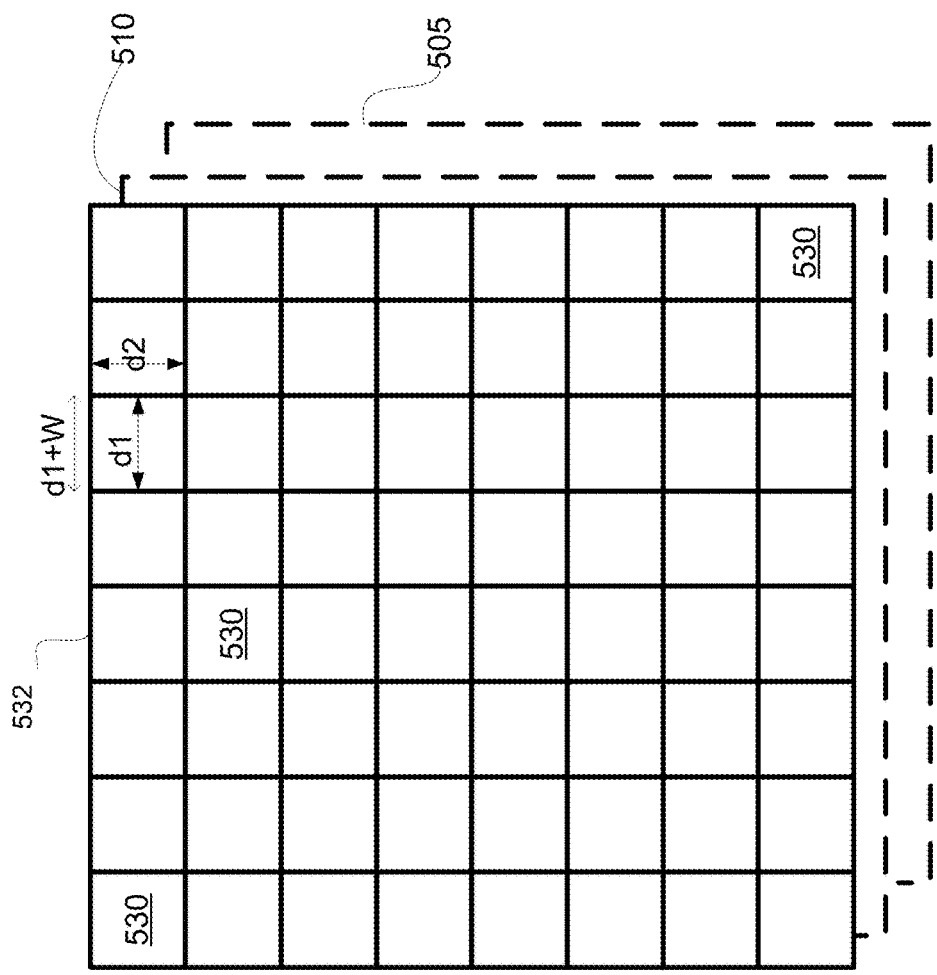
FIG. 3 is an example of one or more parts of an apparatus and of a display.
Figure 4:
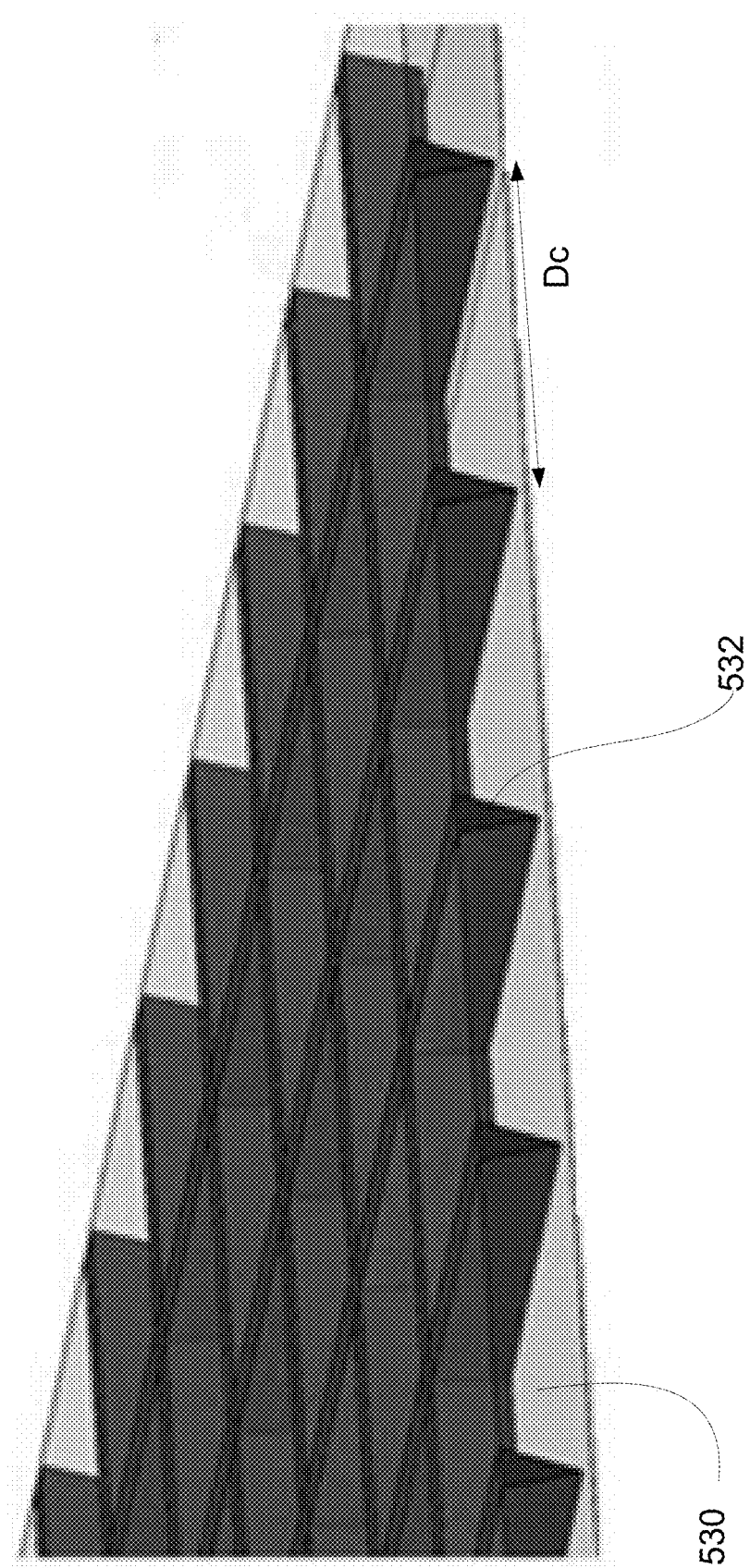
FIG. 4 is an example of one or more parts of an apparatus.

FIGS. 3 and 4 illustrates an array of spatial filters 532 and transparent elements 530 positioned between the spatial filters 532. While FIGS. 3 and 4 illustrates rectangular spatial filters—spatial filters of other shapes may be used. For example—spatial filters that are micro-structures that may fully cover the display area can be considered, such as an array of triangles, rectangles, hexagonal etc.

In FIG. 3 each transparent elements has a width of d1 and a length of d2 and the maximal thickness of each spatial filter is denoted W.

In FIG. 3 the array of spatial filters (and one or more other components of the apparatus) is illustrated as being positioned on a display that may include a glass layer 510 and an array of pixels 505.

The pixels may be color pixels.

The pitch between the pixels may depend on the resolution of the display. In today mobile phone the pitch is around 40 micron (um). The glass layer 510 may have a height of about 0.5-1 mm.

This configuration is typical for the various types of digital displays.

Figure 5:
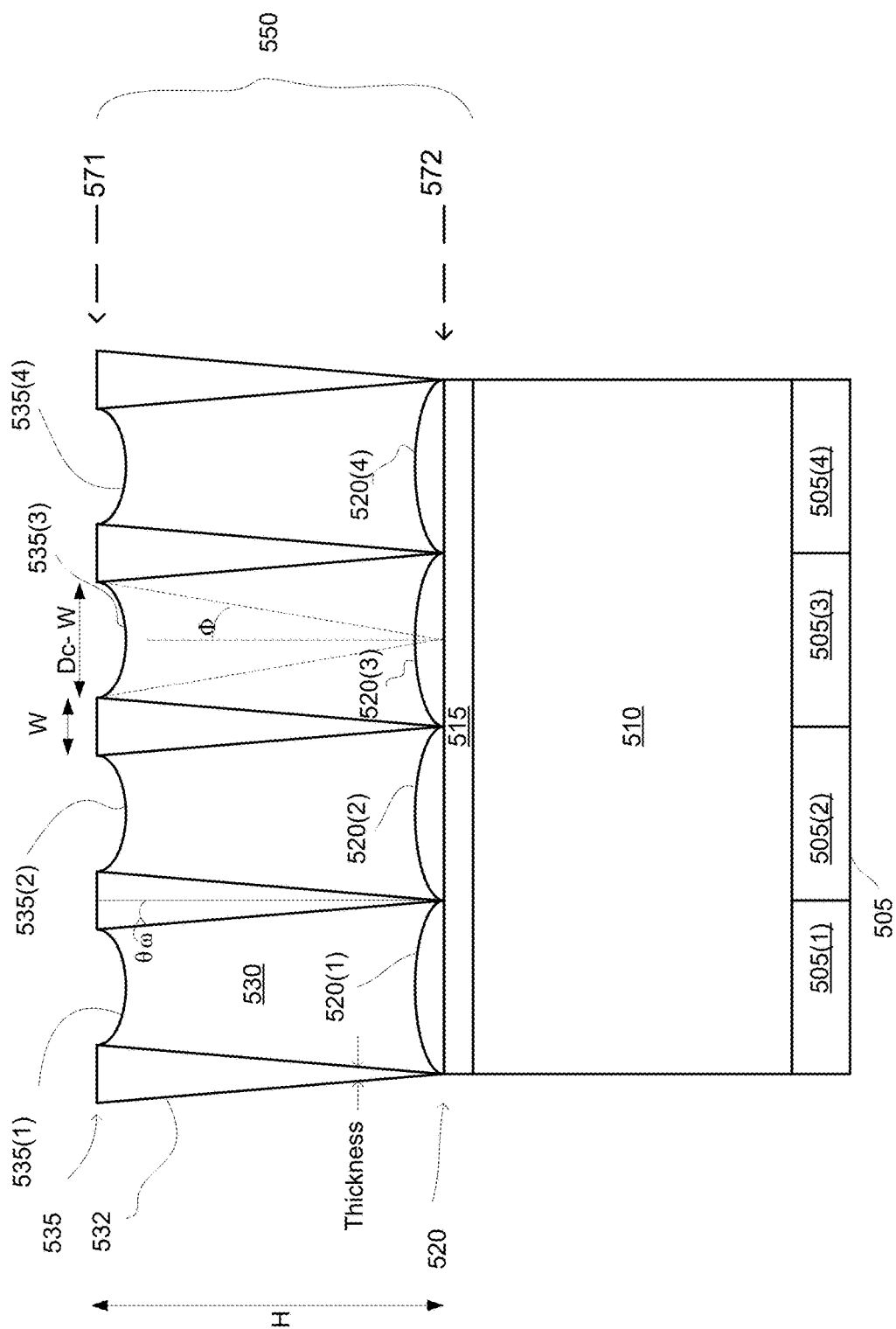
FIG. 5 is an example of one or more parts of an apparatus and of a display.

FIG. 5 illustrates an example of an apparatus 550, glass layer 510 and pixel layer 505 (including pixels 505(1)-505(4)).

Figure 6:
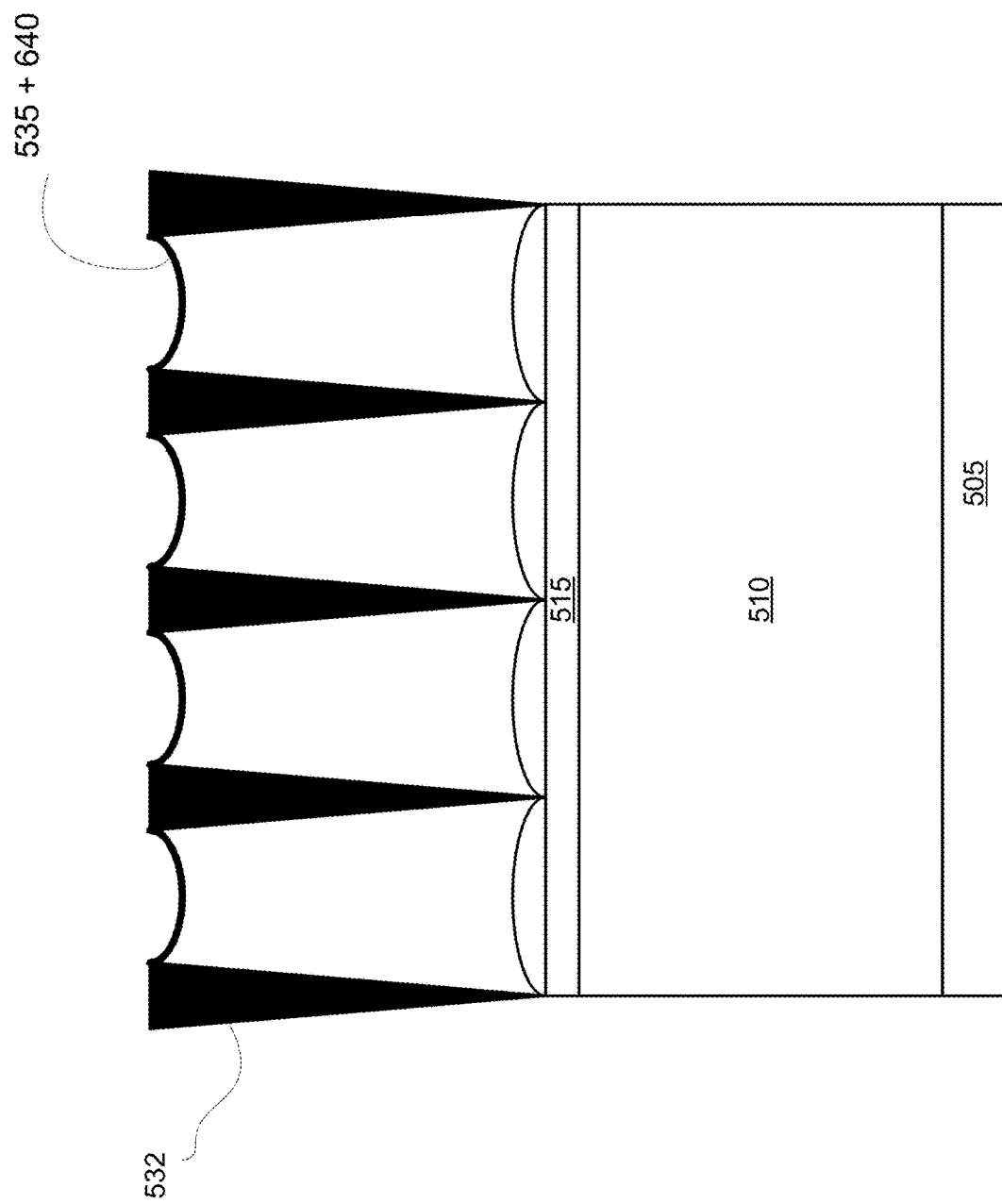
FIG. 6 is an example of one or more parts of an apparatus and of a display.

Apparatus 550 (may be in the form of a thin layer element) is attached to glass layer 510, and may include:

a. Base layer 515 that may include an index matching glue between the display and the cover which decreases the reflection from that interface.

b. A first array of microlenses 520 (such as microlenses 520(1)-520(4)), with width Dc and focal length f1.

c. An array of spatial filters 532. The array of spatial filters may be arranged to (a) filter side the ambient light (ambient light that is coming from directions that are not perpendicular or close to be perpendicular to the display), and (b) keep the resolution of the image. The array of spatial filters includes an interior end 572 and an exterior end 571.

d. A second array of microlenses 535 (for example negative lenses 535(1)-535(4) having a pitch of Dc and focal length f2 that resides on the upper layer. The second array of microlenses may be arranged to (a) re-collimate the displayed image to the desired field of view, and (b) act as a matte surface Apparatus 550 may also include an ARC (Anti-Reflective Coating) layer. It is denoted 640 in FIG. 6. In FIG. 6 the ARC layer is positioned on the second array of microlenses. The ARC layer may further increase the transmission of the displayed image as well as decrease the reflected light intensity of the ambient image.

It should be noted that one can use only part of the above-mentioned layers or organize them in a different order as well as to add more layers or combine the layers into one layer.

The spatial filter of array 532 may include rectangular micro-elements—or micro-elements of other shapes—for example triangles, rectangles, hexagonal etc.

In FIGS. 3-5 rectangular spatial filters are shown—each surrounding a transparent element 530 having a size of d1*d2 and height H.

The transparent element allows the rays that are generated in the display 505 to penetrate via the transparent material toward the eye of the user which enables him to see the content that is displayed.

FIG. 5 illustrates that each pixel is associated with a pair of microlenses (one microlens of the first array and one microlens of the second array). It should be noted that more than a single pixel may be associated with a single pair of microlenses. It should be noted that both cases (single pixel or a group of pixels associated with a pair of microlenses) the image displayed on the display may be outputted to the user without distortions that are noticeable to the human eye. Accordingly—in both cases there is no loss of resolution because a blur circle of a human eye on the display is larger than the size of the pixel. Furthermore—while FIG. 5 illustrates the pixels as having the same width as the microlenses of the first and second arrays—it should be noted that the pixels may be shorter or longer than the microlenses of the first and second arrays.

FIGS. 4 and 5 illustrates spatial filters that have a V-cross section—their thickness increases towards the exterior end of the array.

The spatial filters absorb side ambient rays that are coming at an angle that exceeds ø relative to the vertical to the display see FIG. 5.

The spatial filters may be made of a material that may include black pigments. The black walls can be perpendiculars of height H and width W, or for reasons of manufacturability have a V shape as depicted in FIG. 5.

In FIG. 5 the visual area of each transparent element is (d1−W)*(d2−W), where W=2H*tan(θω), d1 and d2 are the dimensions of the transparent element in the base. For simplicity we choose that d1=d2=Dc and the height of the element is H. Typical values of Dc, W and H may be on the scale of micrometers. Dc, H and θω have a significant impact on filtering of the ambient light that is not perpendicular to the display, on the other hand if H is too high W increases and the light coming from the display will be attenuated significantly. Dc may be on the order of the pixel pitch in order to maintain the resolution of the display but somewhat different, in order to avoid possible Moiré artifacts.

It is clear that as d1 and d2 are reduced and/or H becomes higher it will increase the filtered ambient light effect. However, decreasing of Dc depends on W. W the width of the black V shape wall, must obey W/di<<1 for both d1 and d2, to ensure that the intensity of light coming from the display is almost not attenuated, however this puts a major constrain on the size of H, namely H will need to be very small, hence the attenuation of the ambient light will be small.

To overcome this issue the apparatus includes the first array of microlenses 520—in which each microlens has width Dc which is adjusted to the spatial filters 532.

The focal length f1 of the microlenses of the first array of microlenses 520 may be designed such that it may collimate most of the energy of the display that is received in each cell onto the second array of microlenses.

This will allow us to choose d1, d2, H and θω without significantly affecting the energy of the display that is transmitted through the cell.

The second array of microlenses 535 may maximize the display intensity at the user's eye. The second array of microlenses may include negative lenses with a focal length of f2.

By defining the values of f1 and f2 one can achieve the desired field of view (FOV) α.

In a case where f1 and f2 have a common focus, all the outgoing rays from a display point on the optical axis of the cell will be parallel and the image of the display will be at infinity.

Layer 535 has two functionalities 1: To re-collimate the rays to the desired FOV. 2. Rays from the ambient background image that are reflected from the surface of layer 535, are scattered by the curved outer surface of each of the microlenses. Due to the repetitive elements of pitch of approximately 40 micrometer it acts also as matte surface and diffuses the incoming ambient light. It must be noted that when a matte layer is added to a regular display on top of its cover glass, it diffuses the ambient light but also blurs the displayed image. This blur effect is caused due the long distance between the image source and the matte layer. In a normal display it is equal to the display glass optical thickness, namely it is ~1000 micrometer. However in our case, due to the small size of the cells, below the resolution of the eye, the re-imaged display appears at the plain of 535, hence the distance between the image source and the matte surface is close to zero, thus there is no blur affect and the image remain sharp. This design ensures that the intensity of the light coming from device 505 is not attenuated, and the display image appears sharp to the user eye as through a transparent layer.

Figure 7:
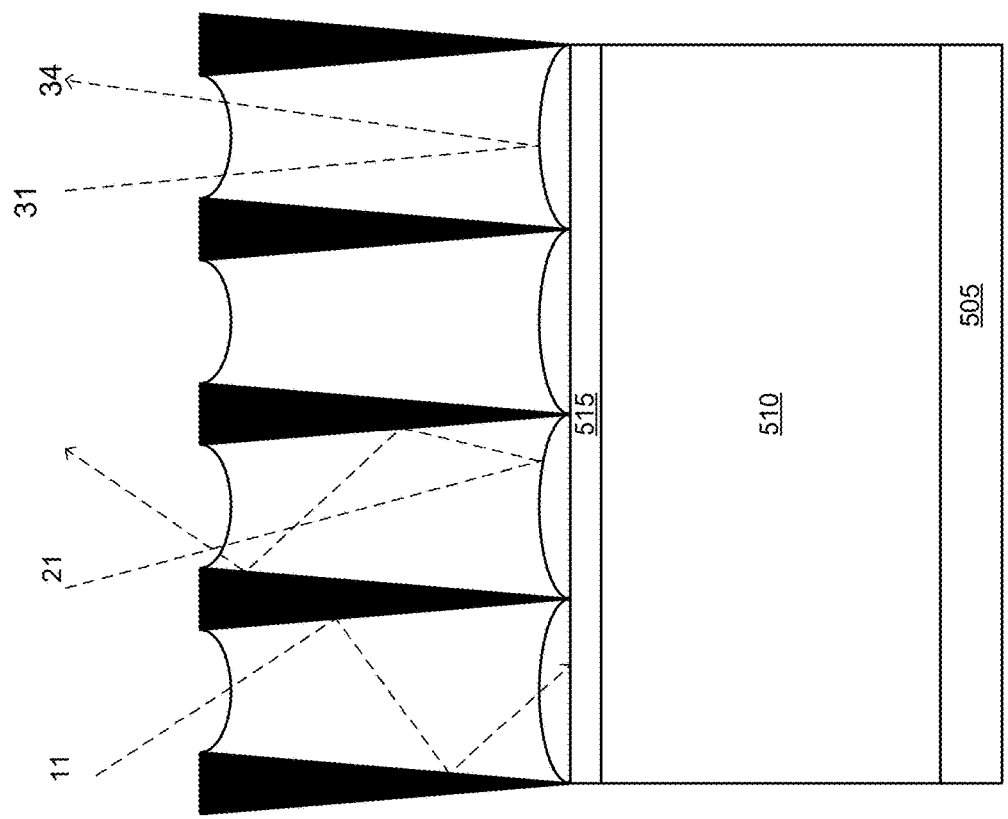
FIG. 7 is an example of one or more parts of an apparatus and of a display.

To further reduce the intensity of the ambient light, we add an addition layer as depicted in FIG. 6. The upper layer 640 is an Anti-Reflective Coating (ARC), which in addition to the diffusion of the ambient light caused by 535 it further reduces the reflection from the upper layer. In addition we add a transparent index matching glue/gel 515. It must be noted that one can choose not to add these layers and use the system without it. The use of an ARC alone without layer 525, 520, 535 is not sufficient to suppress the glare of the ambient light on a sunny day, FIG. 7 illustrates the paths of some ambient rays 11, 21 and 31.

Each one of the rays is partially reflected and partially absorbed by the black walls of the array of spatial filters 532(1)-532(4) hence, they act as a trap for the ambient light and drastically decrease its reflected intensity.

Figure 8:
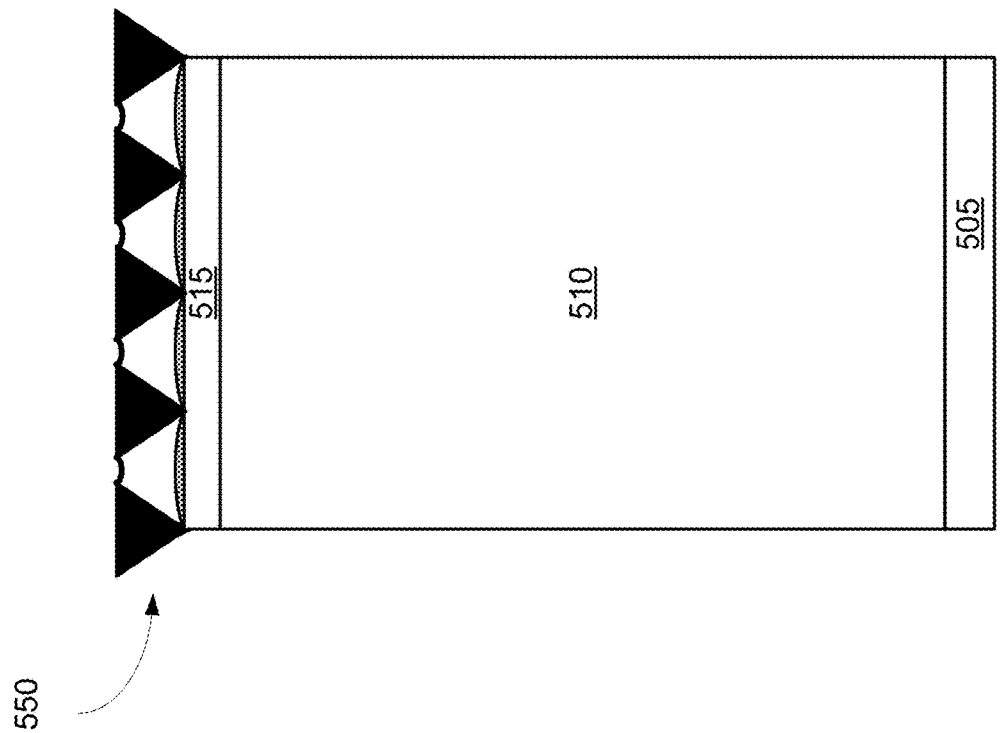
FIG. 8 is an example of one or more parts of an apparatus and of a display.

FIG. 8 illustrates an example of the spatial relationship between glass layer 510, apparatus 550 and pixels 505. The height of glass layer 510 is about 1000 micron and the height of apparatus 550 is about 100 micrometer.

FIG. 8 illustrates an example of the spatial relationship between glass layer 510, apparatus 550 and pixels 505.

FIGS. 5-8 illustrate that each part of the display with dimension Dc is surrounded by a spatial filter and is associated with dedicated microlenses of the first and second microlenses arrays. Each pixel is optically projected by the pair of microlenses outside the apparatus, there is no mix between neighbor pixels, which means that the resolution of the display is preserved. It must be noted that even in the case where group of pixels is imaged via the same lens, there is no loss of resolution because the blur circle of the eye on the display is larger than the size of a modern, high resolution, display pixel FIGS. 4-8 illustrate spatial filters of thicknesses that decrease towards the display and the first and second arrays of microlenses were proximate to the interior and external ends of the array of spatial filters, respectively. The first array of microlenses did not exceed the interior end of the array of spatial filters.

Figure 9:
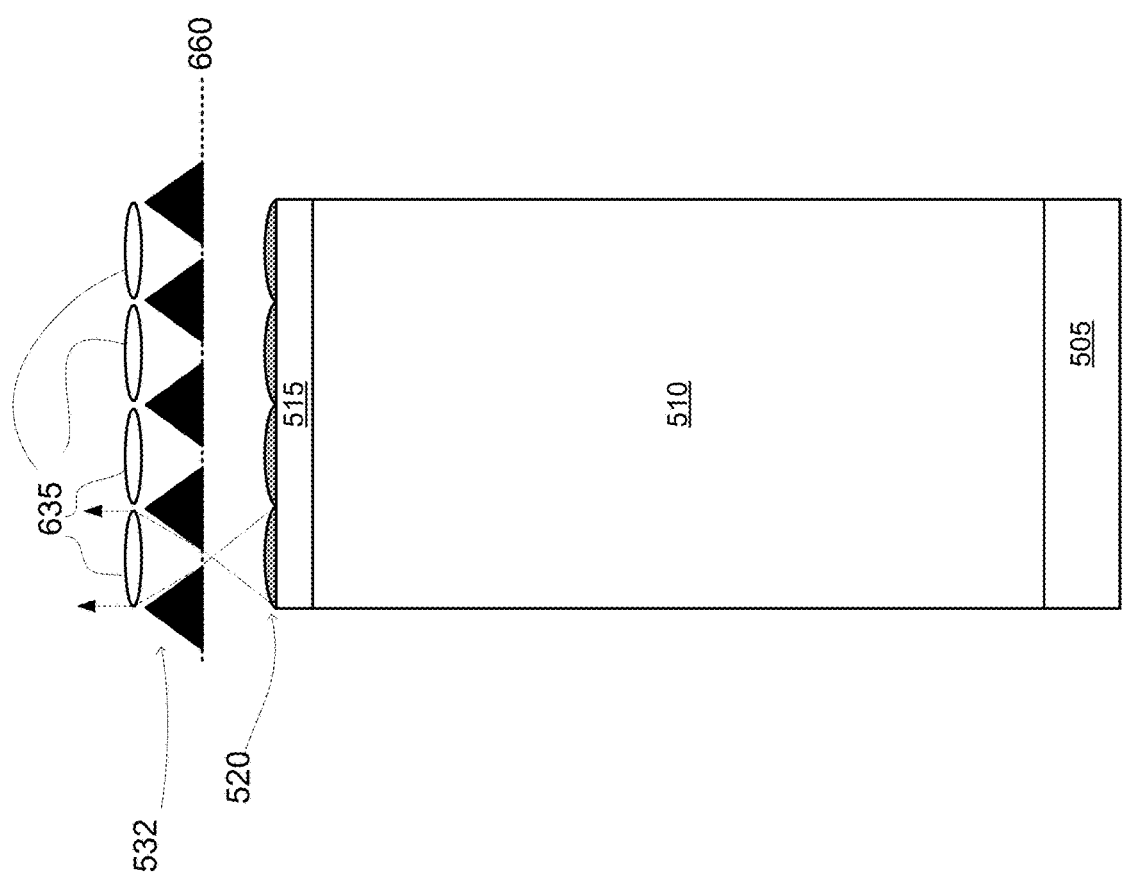
FIG. 9 is an example of one or more parts of an apparatus and of a display.
Figure 10:
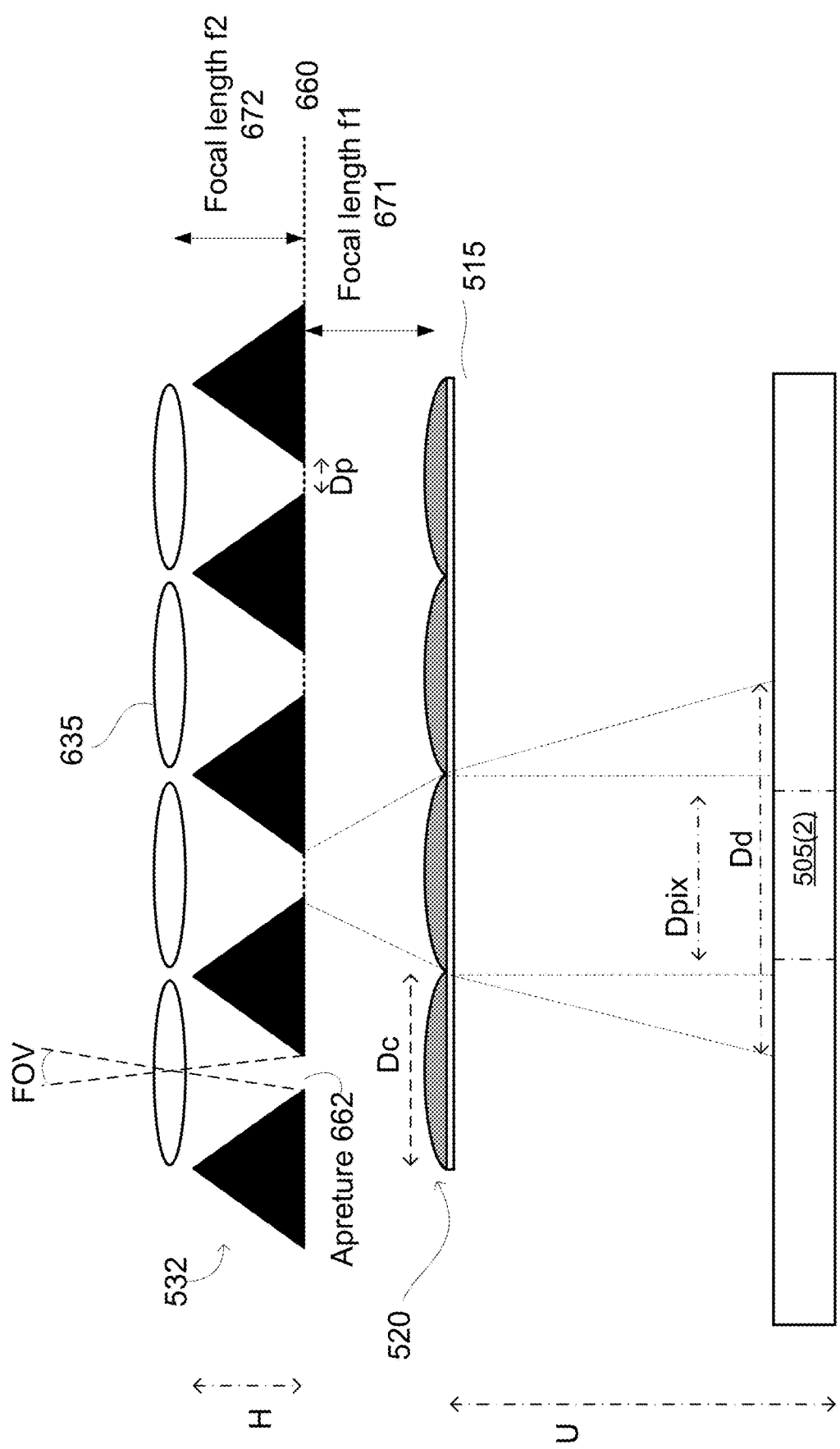
FIG. 10 is an example of one or more parts of an apparatus and of a display.

FIGS. 9-10 illustrates spatial filters that have a thickness that increases towards the display, the array of spatial filters is spaced apart from the first array of microlenses and the second array of microlenses is positioned near the exterior end of the array of spatial filters.

The first array of microlenses 520 image pixels to pin holes (apertures 662 of FIG. 10 having a width of Dp) formed by the array of spatial filters 532 of height H. The array of spatial filters blocks side ambient light and preserves the image resolution by preventing crosstalk between adjacent cells. The focal length of the first array of microlenses array is denoted f1 671. The focal length of the second array of microlenses array is denoted f2 672. The focal plane of the microlenses of the first and second array of microlenses is denoted 660. U is a distance from base layer 515 and a bottom of pixel 505(2).

The second array of microlenses includes positive lenses 635 with f2 that re-collimate the light to provide the desired FOV. In cases where f1=f2, the magnification of the display through each cell is 1 and its image is at Infinity. Due to the repetitive nature of the lens array and the size of its individual elements being below the resolution of the eye, a matte effect is achieved which diffuses the ambient light. It should be noted that this matte effect does not blur the image. This is due the fact that that each pair of lenses, with the spatial filter at their mutual focus, act as a telescope that projects the image of the display at infinity.

An ARC can be added to the second array of microlenses in order to further reduce the reflected ambient light.

It should be noted that one can combine these layers in different ways or to use part of these layers. This structure of layers is provided as an example of how the system and method can be implemented.

The apparatus can be embedded as a special layer in the display of the device or can be used as an add-on transparent element that covers the display.

Referring to the solutions presented in FIGS. 6, 9 and 10—as we decrease the FOV, we can get an extra desired phenomenon of privacy. Namely only the user that holds the phone can see the display and for users that are aside, the display content will be invisible.

It must be noted that due to the fact that the apparatuses of FIGS. 6 and 8-10 reduce the ambient light, in some cases the display intensity can be decreased and still have good visibility of the display. This fact can be used to reduce the power dissipation of the display which has a significant impact on the battery life of the device.

In most of the mobile phones, there is a light sensor in the front of the display to measure the light intensity. With this information the display can use auto brightness algorithm that change the display brightness according to the ambient light. If our filters cover also the light sensor, the filters will reduce the ambient light that the sensor detects and hence will reduce automatically the brightness of the display which will reduce the power consumption of the display. In case that one doesn't cover the light sensor, similar effect can be achieved by using a software application that changes the intensity of the measured light Im to the correct Intensity Ic.

Typical correction can be Ic=Im−Bias

Where Bias—correction value.

The following are some performance analysis of the above mentioned alternatives.

Referring to FIG. 10—Dc is the dimension of the (Square) cell, without a loss of generality, the cell may be triangular, rectangular, and hexagonal or any other shape that covers the area of the display. In this configuration each cell includes a "telescope" that is composed of two positive lenses. The outer lens (having focal length of f2) is installed between spatial filters that absorb the ambient light. Their focal points (distant at focal lengths f1 & f2 from first and second microlenses respectively) are aligned to have a mutual focus. In their mutual focus, there is a gap between the black walls with a dimension of Dp (pinhole)

The size on the display that is imaged by first microlens onto the "pinhole" Dd is $$Dd = Dp * \frac{U}{H}$$

Note: Dd≥Dpix may be larger than the size of the display pixel with no loss of resolution because the blur circle of the eye on the display is larger than the size of a modern, high resolution, display pixel The geometric de-magnification is M. Where $$M = H/U$$

and $$f1 = H/(1+M)$$

G the gain brightness of the display power that is transmitted through each cell is $$G = \left(\frac{f2}{H}\right)^2$$

The Field Of View (FOV) of the display power that is transmitted through each cell is $$FOV = \frac{Dd}{U} * \frac{H}{f2}$$

namely $$FOV = \frac{Dd}{U} \Big/ \sqrt{G}$$

As an Example:

Let's assume that the units are μm and the dimensions are of the optical paths (include indexes of refractions) U=1000, Dpix=44, Dc=50, Dd=100, H=100, f2=100, n=1.5 is the average index of refraction of the clear material Then:

$$Dp = Dd * \frac{H}{U} = 100 * \frac{100}{1000} = 10$$

$$M = H/U = 100/1000 = 0.1$$

$$f1 = H/(1+M) = 100/1.1 = 91$$

$$G = f2/H = 1.$$

Note that cell and pitch sizes are below the resolution of the eye $$FOV = \frac{100}{1000} * \frac{100}{100} = 100 \text{ mRad} = 5.73°$$

The net foil thickness is as follows:

The total optical thickness is (H+f2)/n=200/1.5=133

The Ambient Light Trapping is calculated as follows:

Let assume the following;

All light rays that enter the lens array are trapped and cannot go out

Anti-Reflective Coating (ARC) on the entrance lenses will lower their reflectance by an order of magnitude The convex surface of the outer lenses and their small size, below the resolution limit of the eye, will make this surface appear matte thus, eliminating sharp reflection of the residual ambient image and further reducing its annoyance Contrast Gain (in the above example):

let

Display Gain: $G=1$

ARC=0.1,MATTE<0.1(effectively equivalent)

Hence: The total contrast gain=G/(ARC*MATTE)>1/(0.1*0.1)>1/0.01>100

Figure 11:
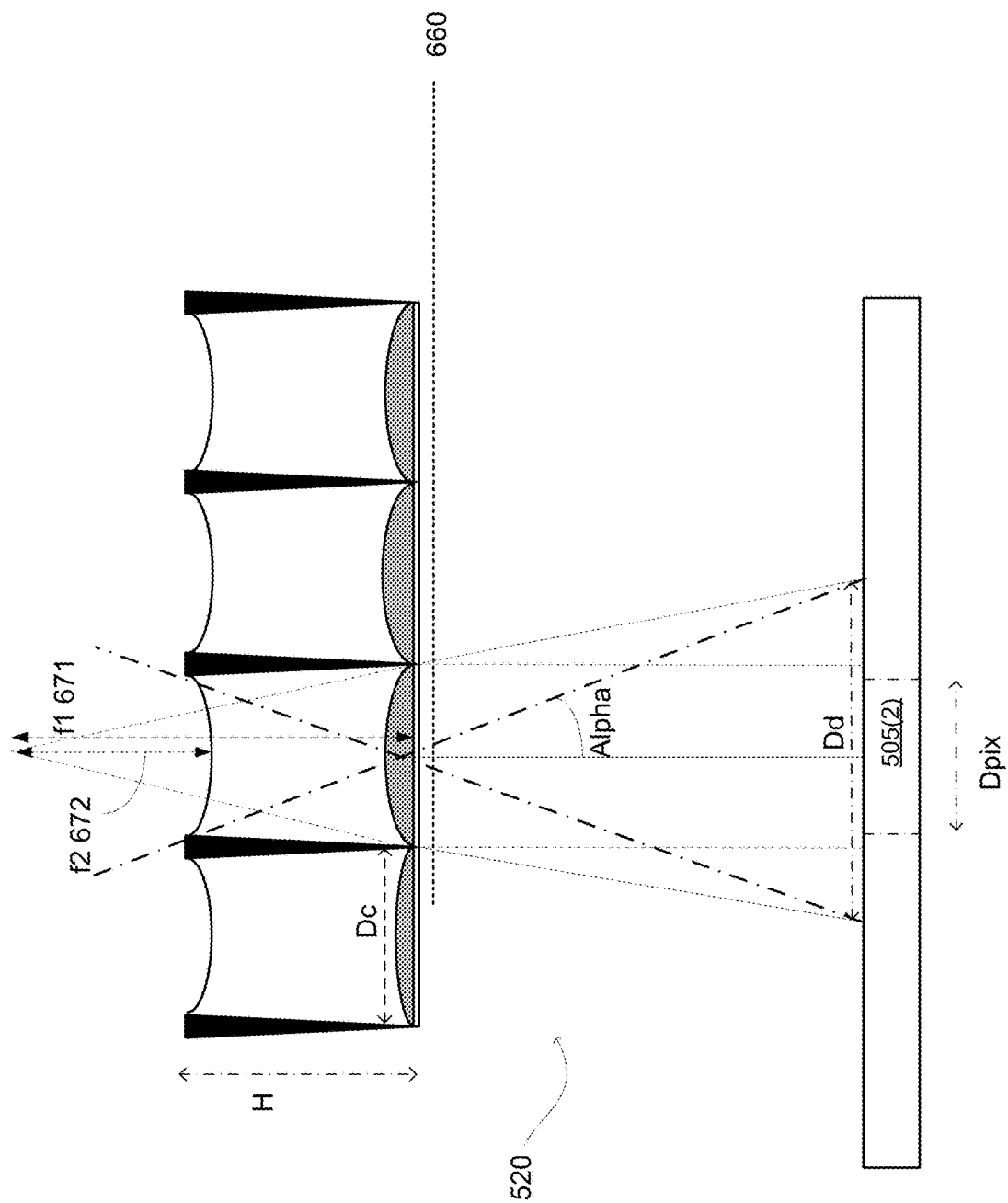
FIG. 11 is an example of one or more parts of an apparatus and of a display.

Following is a calculated example of the option with the negative lens array. We will refer to FIG. 11 that is magnification of FIGS. 5 and 6.

Let assume that:

Dimensions are of optical paths (include indexes of refractions)

U=1000, Dpix=44, Dc=50, θw=5°, H=20, n=1.5 is the average index of refraction of the clear material Then:

$$\tan(\alpha)=Dc/2U$$

$$\tan(\theta w)=Dc/2V$$

$$1/f1=1/V+1/U=2\tan(\alpha)/Dc+2\tan(\theta w)/Dc$$

Hence $$1/f1=2/Dc*[(\tan(\alpha)+\tan(\theta w)]$$

$$f1=Dc/[2([Dc/2U+\tan(\theta w)]=222$$

$$V=Dc/2\tan(\theta w)=286$$

$$M=V/(V-H)=1/(1-H/V)=286/266=1.075$$

$$G = 1/M^2 = \left(1 - \frac{H}{V}\right)^2 = 0.87$$

is the display brightness gain.

$$i.\ FOV = \frac{Dd}{U} * M = \frac{100}{1000} * 1.075 = 107.5\ \text{mRad} = 6.16°$$

Net foil thickness:

The total optical thickness is H/n=20/1.5=13.3

This is a very thin film which will require adding a base layer.

In the detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to an apparatus capable of executing the method.

Any reference in the specification to an apparatus should be applied mutatis mutandis to a method that may be executed by the apparatus.

The term "and/or" is additionally or alternatively.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

The phrase "may be X" indicates that condition X may be fulfilled. This phrase also suggests that condition X may not be fulfilled. For example—any reference to a apparatus as including a certain component should also cover the scenario in which the apparatus does not include the certain component.

The terms "including", "comprising", "having", "consisting" and "consisting essentially of" are used in an interchangeable manner. For example—any method may include at least the steps included in the figures and/or in the specification, only the steps included in the figures and/or the specification. The same applies to the apparatus and the mobile computer.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one as or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements the mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

Any combination of any component of any component and/or unit of apparatus that is illustrated in any of the figures and/or specification and/or the claims may be provided.

Any combination of any apparatus illustrated in any of the figures and/or specification and/or the claims may be provided.

Any combination of steps, operations and/or methods illustrated in any of the figures and/or specification and/or the claims may be provided.

Any combination of operations illustrated in any of the figures and/or specification and/or the claims may be provided.

Any combination of methods illustrated in any of the figures and/or specification and/or the claims may be provided.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. An apparatus for enhancing display visibility of a display that comprises multiple display pixels, the apparatus comprises:
    an array of spatial filters that are construed and arranged to block side ambient radiation;
   wherein each spatial filter has a thinnest portion having a thickness of microscopic scale;
    transparent elements that are positioned between the spatial filters of the array;
        a first array of microlenses that is arranged and construed to focus radiation generated by the display to provide focused radiation that propagates through the transparent elements without impinging on the array of spatial filters; and
        a second array of microlenses that is arranged and construed to re-collimate the focused radiation to provide an output radiation; and
        an anti-reflective coating layer
        wherein the first array of microlenses is spaced apart from the second array of microlenses; and
        wherein a focal point of a microlens of the first array of microlenses overlaps, within a space between the first array of microlenses and the second array of microlenses, a focal point of a corresponding microlens of the second array of microlenses.

2. The apparatus according to claim 1 wherein the apparatus is configured to convert the radiation generated by the display to the output radiation without introducing distortions and loss of resolution.

3. The apparatus according to claim 1 wherein the apparatus consists essentially of the array of spatial filters, the transparent elements, the first array of microlenses, and the second array of microlenses.

4. The apparatus according to claim 1 wherein a focal point of each microlens of the first array of microlenses overlaps a focal point of a corresponding microlens of the second array of microlenses.

5. The apparatus according to claim 1 the microlenses of the first array of microlenses and the microlenses of the second array of microlenses are positioned at opposite sides of the array of the spatial filters.

6. An apparatus for enhancing display visibility of a display that comprises multiple display pixels, the apparatus comprises: an array of spatial filters that are construed and arranged to block side ambient radiation; wherein each spatial filter has a thinnest portion having a thickness of microscopic scale; transparent elements that are positioned between the spatial filters of the array; a first array of microlenses that is arranged and construed to focus radiation generated by the display to provide focused radiation that propagates through the transparent elements without impinging on the array of spatial filters; and a second array of microlenses that is arranged and construed to re-collimate the focused radiation to provide an output radiation; wherein the first array of microlenses is spaced apart from the second array of microlenses; and wherein a focal point of a microlens of the first array of microlenses overlaps, within a space between the first array of microlenses and the second array of microlenses, a focal point of a corresponding microlens of the second array of microlenses; comprising a base layer that is arranged and construed to reduce refraction index mismatches between the apparatus and a glass layer, wherein the glass layer is attached to the display or belongs to the display.

7. An apparatus for enhancing display visibility of a display that comprises multiple display pixels, the apparatus comprises: an array of spatial filters that are construed and arranged to block side ambient radiation; wherein each spatial filter has a thinnest portion having a thickness of microscopic scale; transparent elements that are positioned between the spatial filters of the array; a first array of microlenses that is arranged and construed to focus radiation generated by the display to provide focused radiation that propagates through the transparent elements without impinging on the array of spatial filters; and a second array of microlenses that is arranged and construed to re-collimate the focused radiation to provide an output radiation; wherein the first array of microlenses is spaced apart from the second array of microlenses; and wherein a focal point of a microlens of the first array of microlenses overlaps, within a space between the first array of microlenses and the second array of microlenses, a focal point of a corresponding microlens of the second array of microlenses; wherein each display pixel is associated with a single microlenses of the first array of microlenses, with a single microlenses of the second array of microlenses, with a single transparent element, and with a single spatial filter.

8. An apparatus for enhancing display visibility of a display that comprises multiple display pixels, the apparatus comprises: an array of spatial filters that are construed and arranged to block side ambient radiation; wherein each spatial filter has a thinnest portion having a thickness of microscopic scale; transparent elements that are positioned between the spatial filters of the array; a first array of microlenses that is arranged and construed to focus radiation generated by the display to provide focused radiation that propagates through the transparent elements without impinging on the array of spatial filters; and a second array of microlenses that is arranged and construed to re-collimate the focused radiation to provide an output radiation; wherein the first array of microlenses is spaced apart from the second array of microlenses; and wherein a focal point of a microlens of the first array of microlenses overlaps, within a space between the first array of microlenses and the second array of microlenses, a focal point of a corresponding microlens of the second array of microlenses; wherein the first array of microlenses is positioned between an interior end of the array of spatial filters and an exterior end of the array of spatial filters.

9. An apparatus for enhancing display visibility of a display that comprises multiple display pixels, the apparatus comprises: an array of spatial filters that are construed and arranged to block side ambient radiation; wherein each spatial filter has a thinnest portion having a thickness of microscopic scale; transparent elements that are positioned between the spatial filters of the array; a first array of microlenses that is arranged and construed to focus radiation generated by the display to provide focused radiation that propagates through the transparent elements without impinging on the array of spatial filters; and a second array of microlenses that is arranged and construed to re-collimate the focused radiation to provide an output radiation; wherein the first array of microlenses is spaced apart from the second array of microlenses; and wherein a focal point of a microlens of the first array of microlenses overlaps, within a space between the first array of microlenses and the second array of microlenses, a focal point of a corresponding microlens of the second array of microlenses; wherein the first array of microlenses is positioned below the array of spatial filters.

10. The apparatus according to claim 9 wherein the array of the spatial filters defines an array of apertures that are positioned between the first array of microlenses and the second array of microlenses.

* * * * *